United States Patent Office 3,120,364
Patented Feb. 4, 1964

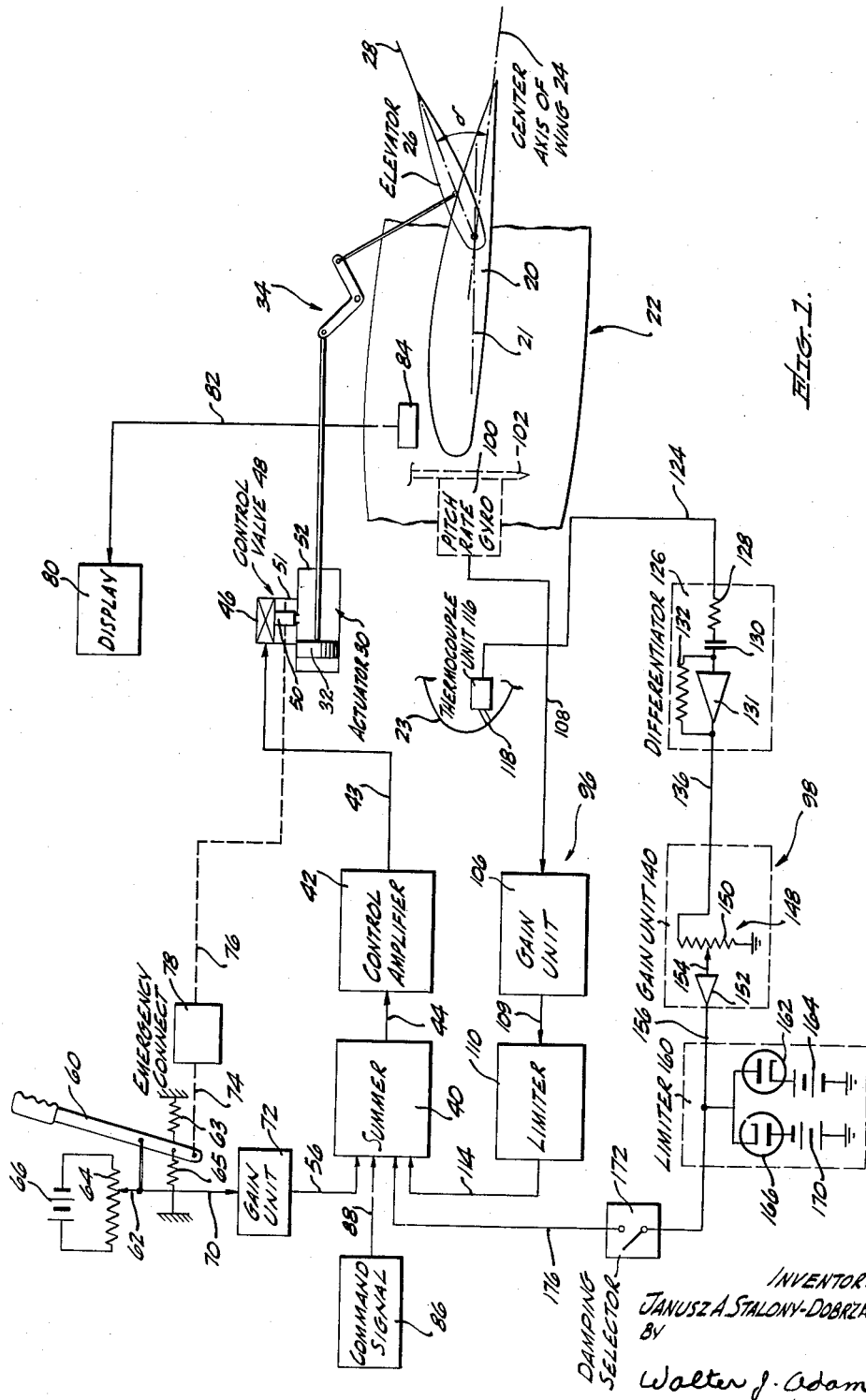

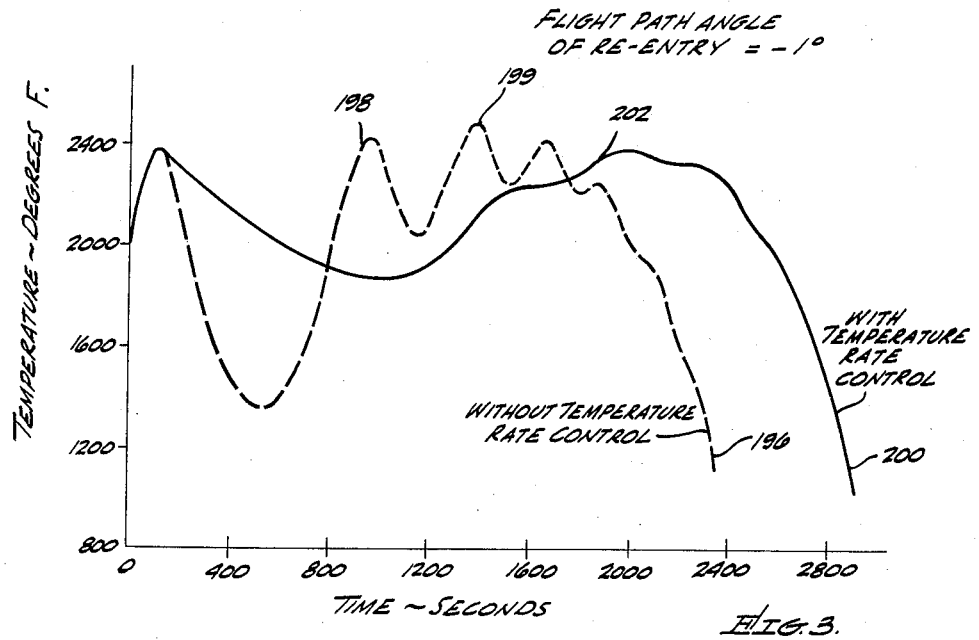
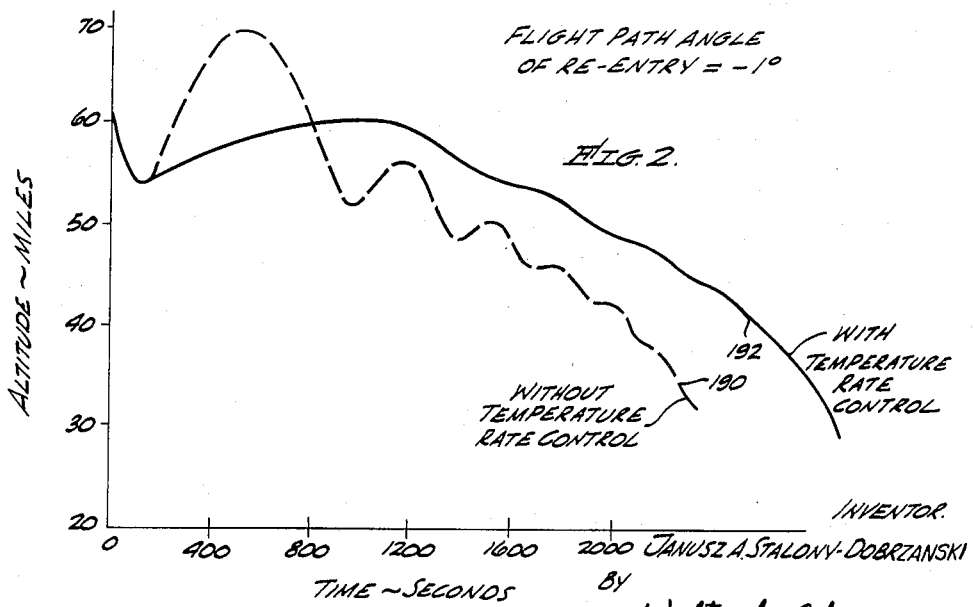

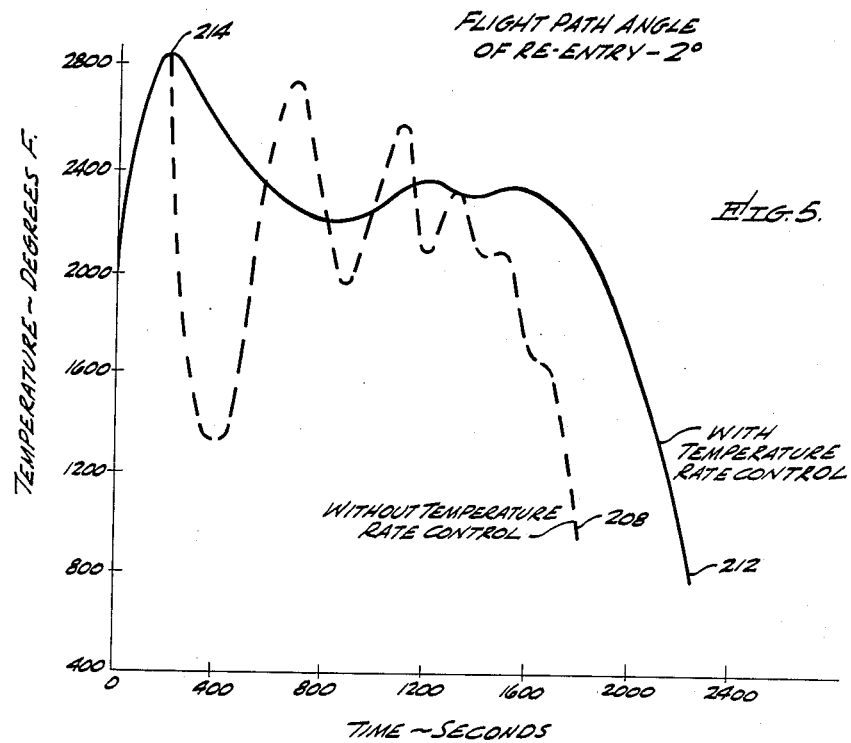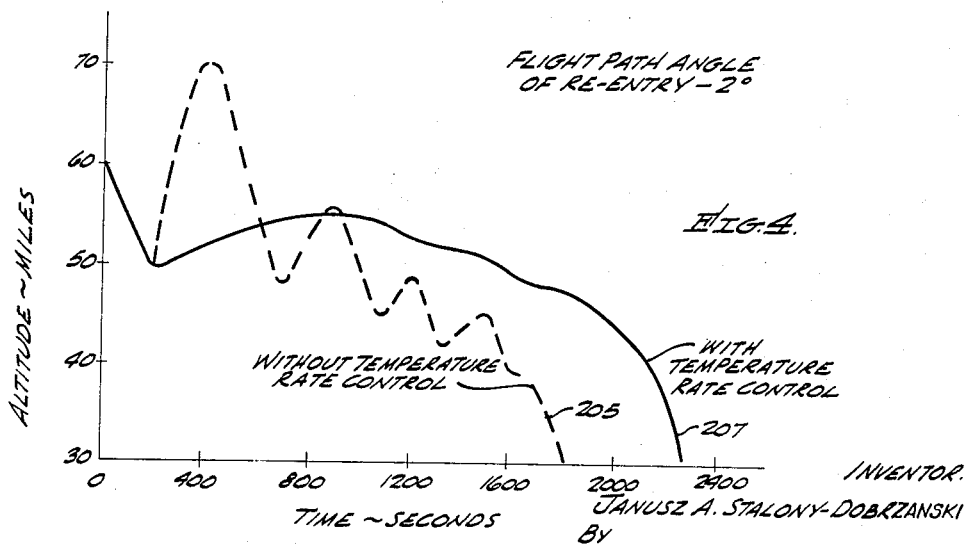

3,120,364
FLIGHT PATH CONTROL SYSTEM FOR ATMOSPHERIC RE-ENTRY OF SPACECRAFT
Janusz A. Stalony-Dobrzanski, Playa Del Rey, Calif., assignor to Hughes Aircraft Company, Culver City, Calif., a corporation of Delaware
Filed July 24, 1959, Ser. No. 829,445
13 Claims. (Cl. 244—77)

This invention relates to flight path control systems for space vehicles and particularly to a system for controlling a lift type craft so as to control the temperature conditions developed on the surface of the craft when entering the atmosphere from space.

It has been found that when a lift type craft, that is a craft developing aerodynamic lift, descends into the atmosphere, the temperature developed on the surface of the craft may exceed the temperature limits of available materials. One cause of this excessive temperature rise is long period oscillations in altitude known as skipping which occurs during uncontrolled reentry from space because of the unbalance of aerodynamic and gravity forces. Because a craft during these oscillations descends to altitudes of increased air density in a relatively short period of time while traveling at a high velocity, the maximum temperature peaks developed are very high. Also, during uncontrolled re-entry of a spacecraft at a shallow flight path angle, that is the angle between the elliptical path at which the craft enters the outer surface of the amosphere after coming out of orbit and the local horizon, the maximum temperature developed on the craft occurs during one of the later long period altitude oscillations. This later increase of temperature may provide an undesirable temperature time history for certain types of re-entry techniques. For example, when utilizing an ablation technique where a material is placed on the stagnation area of the nose and leading edges of the wings to melt during re-entry so as to lower the temperature of the craft by removing the excess heat flow, it would be very desirable if the time of occurrence of the maximum temperature were during the initial portion of the re-entry. In addition to the temperature time history consideration, a flight control system to provide satisfactory conrol of the craft must also damp the short period oscillations, which are the oscillations of the aircraft about its center of gravity.

During re-entry, a system which controls these long and short period oscillations, which lowers the maximum temperature developed on the carft and which controls the temperature time history would be very advantageous. One possible way to control the re-entry path is to sense the pressure, which in turn develops signals to control the elevators in the craft in a desired manner. However, pressure sensing is not desirable with the low atmospheric pressure at high altitudes, because there is not sufficient pressure differential to provide an accurate and reliable system. Furthermore, a pressure sensing system would depend on atmospheric conditions which may be variable. Also, if absolute pressure were being sensed, accurate calibration of the pressure sensing devices would be difficult. A system responsive to temperature rate of change on the surface of the craft to automatically control the elevators and in turn control the altitude of the craft so as to maintain a desired path during re-entry into the atmospheric would be very advantageous. A temperature rate system would have a high degree of reliability because presently developed temperature sensing devices are accurate at high temperatures and because calibration requirements would be at a minimum for a type of system which senses only rate of temperature change.

It is, therefore, an object of this invention to provide a system to control the temperature developed on a craft during re-entry into the atmosphere, which system is independent of atmospheric variations.

It is a further object of this invention to provide a flight control system for a craft which reduces the maximum temperature developed during re-entry into the earth's atmosphere.

It is a still further object of this invention to provide a flight control system which controls the time history of the temperatures developed on the surface of the craft.

It is another object of this invention to provide a flight control system for a craft descending into the atmosphere which is highly reliable and which is directly controlled by the rate of change of the temperature developed on the surface of the craft.

It is another object of this invention to provide an automatic flight control system for controlling re-entry from space into the atmosphere which can be utilized to not only eliminate short period oscillations of the craft around its center of gravity but also eliminates the long period oscillations caused by rapid descent into the atmosphere.

Briefly, this invention is a flight control system for craft of the type having lift characteristics, which system automatically controls the elevators and the flight path of the craft in a desired manner when re-entering the atmosphere from an orbit in space. The system includes a pitch-rate loop which controls the normal short period oscillations associated with this type of craft. A temperature rate loop is also provided to control the long period oscillations or altitude skipping of the craft caused by rapid entry into the relatively dense atmosphere. The temperature rate loop operates by sensing the skin surface temperature of the craft to develop a signal, differentiating the signal to give a signal indicating rate of temperature change, and then limiting the temperature rate signal to maintain the system operation within desired limits. The temperature rate signal is then combined in a summer with a pitch rate signal developed by the pitch-rate loop and is passed to an actuator which controls the elevators of the craft. Means are also provided to pass navigation signals to the summer for controlling the craft when the temperature control is not required. Because temperature rate change is utilized to control the altitude skipping, a highly accurate and reliable system is provided. Depending upon the flight path angle at which the craft enters the atmosphere, this system has the advantage of either reducing the maximum temperature developed on the surface of the craft or controlling the temperature time history in a desired manner.

The novel features which are believed to be characteristic of the invention, both as to its organization and method of operation, together with further objects and advantages thereof, will be better understood from the following description considered in connection with the accompanying drawing in which like characters refer to like parts and in which:

FIG. 1 is a schematic diagram showing the automatic flight path control system of this invention;

FIG. 2 is a graph of time versus altitude showing curves indicating a craft entering the atmosphere at a sixty mile altitude with a flight path angle of −1 degree, both with and without the temperature rate feedback system of FIG. 1;

FIG. 3 is a graph of time versus temperature showing curves for the temperature variation at the stagnation point of the craft under the conditions of the curves of FIG. 2;

FIG. 4 is a graph of time versus altitude showing curves indicating a craft entering the atmosphere at a sixty mile altitude with a flight path angle of −2 degrees, both with and without the temperature rate feedback system of FIG. 1;

FIG. 5 is a graph of time versus temperature showing curves of a craft entering the atmosphere under the conditions of the curves of FIG. 4, both with and without the temperature rate feedback system of FIG. 1;

Referring first to FIG. 1 which shows the flight control system in accordance with this invention, the arrangement of the elements will be first described. An aircraft wing 20 is shown attached to a portion of a craft structure 22. The structure 22 includes a nose portion 23 on which is the stagnation point of the craft in flight. As is well known, the stagnation point of a moving craft is the point where the maximum pressure is reached and where the velocity of air is zero. The structure 22 has an axis 21 which corresponds to the velocity vector of the craft. The angle of attack of the craft is the angle between the axis 21 and a plane horizontal to the surface of the earth directly below the craft. The wing 20 provides aerodynamic surfaces to provide lift to the craft in the presence of an atmosphere, as is well known in the art. It is to be noted that this system is utilized in a spacecraft which develops lift forces as contrasted to space devices which descend into the atmosphere developing drag forces only. The wing 20 has a fixed reference axis 24 as shown. An elevator 26 is provided on the wing 20 to allow aerodynamic control of the reference axis 24 relative to the local horizontal of the earth at any altitude in the atmosphere, for example. An angle δ which is the elevator angle is shown as the angle between the reference axis 24 and a center axis 28 of the elevator 26. The angular position of the elevator 26 is varied by an actuator 30 which may include a plunger 32 connected by suitable lever arrangements 34 to the elevator 26. Thus, the actuator 30 controls the position of the elevator 26 and the direction of the axis 21 of the craft relative to the surface of the earth directly below the craft so that the craft follows a desired flight path as it descends from an orbit through the atmosphere to the earth.

For providing signals to control the position of the actuator 30 and the elevator 26, a summer 40 is provided to receive and combine a plurality of control signals as will be described subsequently. The summer 40 may be a conventional summer circuit including a resistor connected to each input which in turn are connected in common through a common resistor to a potential source. Also, the summer 40 may be a magnetic amplifier type signal combining device. The summer 40 is connected to a control amplifier 42 by way of a lead 44, the amplifier increasing the amplitude of the voltage of a combined control signal to a desired level. The control amplifier 42 is connected by a lead 43 to a valve control circuit 46 of a control valve 48. The valve control circuit 46 varies the position of a plunger 50 of a valve device 51 which in turn controls the fluid and pressure in a cylinder 52 for determining the position of the plunger 32. The actuator 30 is well known in the art and will not be described in further detail.

In the system in accordance with this invention, the elevator angle δ of the elevator 26 may be controlled by a pilot as well as by automatic means. Thus, one of the input leads to the summer 40 is a lead 56 which applies a signal responsive to the position of a control stick 60 as determined by the pilot (not shown). The control stick 60 includes a suitable feel unit which is shown as springs 63 and 65 respectively, connected between stationary points and the control stick 60. It is to be noted that in the system of FIG. 1, only the elevator controls are shown. However, as well known in the art, the control stick 60 and aerodynamic surfaces other than the elevator 26 may also be provided to control the position of the craft in other planes of movement. The position of the control stick 60 determines the position of a contact arm 62 of a potentiometer resistor 64. The resistor 64 is shown connected to a battery 66 as a suitable power source. The contact 62 is connected by a lead 70 to a gain unit 72 which provides sufficient change in potential level of a signal developed across the resistor 64 to conform to a desired potential level of the summer 40.

The control stick 60 is also connected to the valve device 50 of the actuator 30 for emergency operation through suitable mechanical connections 74 and 76 which connect at one end to an emergency connection device 78.

For manual control of the position of the elevator 26, a display device 80 is provided to be viewed by the pilot, which device may include a plurality of indicators as well known in the art. The display device 80 is connected by a composite lead 82 to a sensor device 84 shown mounted to the aircraft structure 22 and which may include a plurality of sensing means, as well known in the art, for sensing velocity and altitude, for example.

Another source of control signals to the summer 40 is a command signal source 86 which is coupled thereto through a lead 88. The command signal source 86 may be controlled from a conventional automatic guidance and navigation system (not shown).

Now that the means for controlling the system by the pilot or by a conventional guidance system have been explained, the automatic controls to provide improved stability and improved temperature conditions on the surface of the craft will now be explained. The automatic control of the elevator angle δ of the elevator 26 is carried out by a pitch rate feedback loop 96 and a temperature rate feedback loop 98. When reentering the atmosphere, a lift type craft exhibits two distinct and separate modes of oscillation. The first oscillations are short period oscillations caused by movement of the craft about its center of gravity in the vertical plane. The second oscillations of the craft descending into the atmosphere are long period oscillations or skipping oscillations caused by the unbalance between the aerodynamic and gravity forces. These skipping oscillations as will be explained subsequently, are very dependent upon the flight path angle of entry of the craft into the atmosphere which in turn is dependent on the amount of retro impulse applied by the craft in the orbit and on the orbit height.

In order to overcome the short period oscillations about the center of gravity of the craft, the pitch rate feedback loop responds to signals developed by a pitch rate gyro 100. The pitch rate gyro 100 is shown mounted to a structural member 102 of the aircraft structure 22 and may be mounted in the craft in any suitable manner, as well known in the art. The pitch rate gyro 100 develops a direct current pitch rate signal having an amplitude indicative of a rate of change of the attitude of the axis 21 of the craft relative to a plane horizontal to the surface of the earth below the craft, for example. However, it is to be understood that pitch rate gyros may be utilized of the type which develop alternating signals, with the addition of a demodulator circuit to develop direct current signals for being utilized in the summer 40. The pitch rate gyro 100 is connected to a gain unit 106 by a lead 108. The gain unit 106 may include a potentiometer circuit and may include amplification circuits. A limiter 110 is connected to the gain unit 106 by lead 109 and may include diode clamping circuits so as to limit the amplitude of the feedback signal of the pitch rate loop 96 to desired upper and lower limits. The limiter 110 is also connected to the summer 40 by lead 114 to apply the pitch rate control signal thereto.

The other source of control signals to the summer 40 is the temperature rate feedback loop 98 which may respond to the stagnation temperature on the nose 23. A thermocouple unit 116 is shown mounted in the nose 23 and includes a thermocouple junction 118 positioned at the stagnation point of the nose of the craft. It is to be noted that the principles of this invention can be applied to systems sensing temperature at points other than the stagnation point. The thermocouple unit 116 is connected to a differentiator 126 by a lead 124 to develop a temperature rate signal from the temperature signal. The differentiator 126, which is a conventional differential amplifier, may include a resistor 128 connected from the lead 124 to one plate of a capacitor 130. The capacitor 130 has its other plate connected to an amplifier 131 and to one end of a resistor 132. The other end of the amplifier 131 and the resistor 132 are connected to a gain unit 140 by lead 136. As is well known, the capacitor 130 and the resistors 128 and 132 carry out a differentiating process with the resistors selected to minimize noise developed by this process. The gain unit 140 may include a potentiometer 148 and an amplifier 152. The lead 136 is connected to one end of a resistor 150. The other end of the resistor 150 is connected to ground. The amplifier 152 has one terminal connected to a contact arm 154 to receive an input signal and another terminal connected to a lead 156 which, in turn, is connected to a limiter 160. The limiter 160 may include a clamping diode 162 having an anode connected to the lead 156 and its cathode connected to the positive terminal of a battery 164, the negative terminal of which is connected to ground. The limiter 160 may also include a clamping diode 166 having a cathode connected to the lead 156 and an anode connected to the negative terminal of a battery 170, the positive terminal of which is connected to ground. As well known in the art, the clamping diodes 162 and 166, respectively, limit the upper and lower voltage level of the signal on the lead 156. The batteries 165 and 170 are selected to provide the desired upper and lower potential values. As will be explained subsequently, the signal on the lead 156 is limited to prevent a sudden change of temperature, as sensed by the junction 118, from controlling the position of the elevator 26 to an undesired extent with a very large elevator angle δ, and to prevent the elevator angle δ from decreasing below a minimum value. The lead 156 is connected from the limiter 160 to one terminal of a skipping oscillation damping selector switch 172, the other terminal of which is connected by lead 176 to the summer 40 to pass a temperature rate control signal thereto. The selector switch 172 may be controlled by the pilot or may be controlled by automatic means such as through a communication system or data receiver (not shown), which responds to signals from the earth. It is to be noted that the elements shown in the temperature rate feedback loop 98 only illustrate one form in which the principles of this invention may be utilized.

In operation, signals are normally applied to the summer 40 from the pitch rate loop 96, and from the command signal source 86 or from the resistor 64 in response to the position of the control stick 60. When the outer surface of the atmosphere is entered the selector switch 172 is closed and the temperature rate loop 98 is connected into the system responsive to the skin surface temperature of the craft. When the switch 172 is closed, the temperature rate loop 98 provides the majority of the control to the elevator 26. The signals applied to the summer 40 have relative amplitudes so that the signal applied thereto from the temperature rate loop 98 dominates the system over the pitch rate loop 96. When the damping selector switch 172 is closed to allow signals to be applied to the summer 40 from the temperature rate loop 98, pilot control of the elevator 26 from the control stick 60 is not utilized. It is to be noted that it may be desirable that the temperature rate loop 98 be utilized only at high altitudes during the re-entry when the high velocity of the craft gives large temperature rises. The summer 40 responds to the polarity of the temperature rate signal on the lead 176 so that an increase of temperature rate at the stagnation point as sensed by the thermocouple junction 118 increases the elevator angle δ and increases the angle of attack of the craft. The temperature rate signal developed by the differentiator 126 may have a polarity to indicate either an increase or a decrease of temperature. The gain of the temperature rate loop 98 is adjusted by the gain unit 140 so that a desired elevator angle change is obtained. The temperature rate signal is limited so as to limit the angle of attack, especially during the initial descent into the atmosphere before the craft pulls up in altitude. Design conditions of the craft determine the magimum angle of attack. After pull out from the initial descent into the atmosphere, the angle of attack is normally controlled below its maximum limit. The signals on the leads 56, 88 and 114 are also combined in the summer 40 with a desired polarity so as to provide either an increase or decrease of the elevator angle δ as required by the signal source. The signals are combined in the summer 40 so that each independent signal either adds or subtracts a voltage value indicative of the position of a desired change or elevator angle so as to provide a total change of elevator angle as indicated by a control signal on the lead 44 as developed above. The temperature rate signal from the temperature rate loop 98 has an amplitude to dominate the elevation angle δ over the pitch rate loop 96. Combining of direct current signals in this manner is well known in the art. The elevator angle in turn controls the angle of attack of the craft which is the angle between the axis 21 of the craft and a plane horizontal to the surface of the earth below the craft.

Referring now to FIG. 2 which is a graph of altitude in miles versus time in seconds, the advantages of the system of this invention will be described in further detail. The graph includes a curve 190 which shows the operation of a craft without the temperature rate feedback loop 98 of FIG. 1 and a curve 192 which shows the operation of the craft with the temperature rate feedback loop 98 connected into the system, that is, with the switch 172 in a closed condition. The performance curves such as the curves 190 and 192 were determined by calculating with an analogue computer, the re-entry of similar lift type crafts with similar conditions between a 300 mile orbit and the point of entering the atmosphere. The calculations were made without any approximations, and all time lags of the craft were considered as well as variable gravitational forces. Other conditions of the re-entry are that the atmosphere was entered at 60 miles altitude and at a flight path angle of −1 degree, the flight path angle being the angle below the local horizon of the earth between the velocity vector or the axis 21 of the craft and the local horizon of the earth at 60 miles altitude. The flight path angle of −1 degree is found to be the smallest angle which is practical to utilize to enter the atmosphere from an orbit. The initial altitude of 60 miles for entering the atmosphere was calculated as the lowest altitude which will give results not significantly different from an actual atmosphere. The maximum angle of attack was 44 degrees and may be maintained by the limiter 160 when the temperature rate feedback system 98 is connected into the system. As can be seen by the curve 190, an altitude skipping oscillation is developed with an initial amplitude of approximately 15 miles without the temperature rate feedback loop connected into the system. With the switch 172 closed the controlled descent of the curve 192 shows an effective damping of this skipping oscillation.

Referring now to FIG. 3 which shows a graph of temperature versus time with curves computed in a similar manner for similar crafts and similar conditions as the curves of the graph of FIG. 2, the variation of the temperature at the stagnation point of the nose 21 of the craft will now be explained. A curve 196 shows the temperature variation at the same point on the surface of the craft without the temperature rate feedback loop 98 connected to the summer 40 to apply a temperature rate control signal thereto. The temperature indicated by the curve 196 varies approximately 1000 degrees F. during the altitude skipping oscillations. A peak 198 of the curve 196 which is a second peak of the temperature oscillation of the descent reaches a temperature of approximately 2400 degrees F. and a peak 199 which is the third peak reaches a maximum temperature of approximately 2480 degrees F. Also, it is to be noted that the temperature after the third peak 199 again rises to a high level at the peaks. A curve 200 is shown representing the temperature variation with the temperature rate control system of this invention connected to the summer 40 by closing the selector switch 172. The maximum temperature of the curve 200 is approximately 2380 degrees F. at a peak 202, thus the temperature rate feedback system of this invention under the conditions of FIG. 3 reduces the maximum temperature at the stagnation point by 100 degrees F., which temperature reduction may prevent melting and destruction of the craft. It is to be noted the temperature values of FIG. 3 were calculated at the stagnation point where the highest temperatures occur. However, temperature at other positions of the surface of the craft would vary in a similar manner but with proportionately lower values.

Referring now to FIG. 4 which is a graph of altitude in miles versus time in seconds, the operation of the system of this invention with a steeper flight path angle will now be described. The craft and the conditions of re-entering are similar to those of FIGS. 2 and 3 except the flight path angle is minus 2 degrees. Thus in FIG. 4, the flight path of the craft enters the surface of the atmosphere at a steeper angle than under the conditions of FIGS. 2 and 3. The range of flight path angles from minus 1 degree to minus 2 degrees are believed to be approximately the lower and higher limits of the desirable angle to re-enter the atmosphere after leaving an orbit for this type of craft. The flight path angle is determined by the magnitude of retro impulse applied in the orbit. From a navigational point of view of range accuracy a steep flight path angle of −2 degrees is best, but from structural considerations of the vehicle a small angle of −1 degree is best because of the lower temperatures developed. In actual design, a flight path angle which is a compromise of the operation between −1 and −2 degrees may be utilized.

The altitude variation of the craft without the temperature rate feedback loop 98 of this invention connected into the system, is shown by a curve 205. As can be seen, the craft initially descends from 60 to 50 miles altitude into the atmosphere and then on the first skipping oscillation rises to 70 miles altitude. It is to be noted that the original descent into the atmosphere is approximately twice the distance than a craft under the conditions of FIG. 2. The skipping oscillations continue until the craft reaches an altitude of approximately 40 miles.

The altitude variation of the craft with the temperature rate feedback loop 98 connected into the system is shown by a curve 207. The craft initially descends from 60 miles altitude to a 50 mile altitude. However, the altitude skipping oscillations are damped by the temperature rate feedback loop 98 of this invention.

Referring now to FIG. 5 which is a graph of temperature versus time for a craft entering the atmosphere under similar conditions as those of FIG. 4 with a flight path angle of minus 2 degrees, the operation will be further described. A curve 208 shows the temperature variation without the temperature rate feedback system of this invention connected into the system, that is with the damping selector switch open. It is to be noted that the temperature under these conditions of FIG. 4 reaches higher peaks than under the conditions of FIG. 3. However, as discussed above, a flight path angle of −2 degrees may be desired because of considerations other than skin temperature, such as considerations of range sensitivity. A curve 212 shows the temperature variation with the temperature rate feedback system connected into the system, that is, with the switch 172 closed. During the first temperature oscillation peak 214, the highest temperature of the curve 212 is reached, the peak temperature being 2800 degrees F. Thus, with this steeper flight path angle of FIG. 4, the peak temperatures with and without the temperature rate feedback system are the same. However, the temperature at the peak 214 is developed during the first skipping oscillation rather than during the third oscillation as in the conditions of FIG. 3. Thus, the temperature time history of a craft has been controlled by the system of this invention as shown in FIG. 5. It is also to be noted that after the temperature peak 214, the maximum temperature of the curve 212 is 2300 degrees where under the conditions of FIG. 3 a temperature of close to 2400 degrees F. is present much later in the descent. The highest temperatures are developed during the initial period of the re-entry because of the low altitude initially descended by the craft while traveling at a high velocity with the steeper flight path angle of −2 degrees. The craft re-entering the atmosphere with a −1 degree angle in FIGS. 2 and 3, initially descended approximately half the distance into the atmosphere while at its high initial velocity, thus reaching its peak temperature at a later time when a low altitude is reached. The advantage of having the peak temperature occur during the first skipping oscillation as under the conditions of FIG. 4 may be utilized where ablation techniques are used, that is when an expendable ablation or heat sink material is placed on the leading edge of the aerodynamic surfaces to absorb heat and so as to provide protection to the aerodynamic surface of the craft. Because the peak temperature occurs during the first portion of the descent, at which time the bulk of the ablation material is present, the controlled temperature time history as shown in FIG. 5 is very advantageous, when required by other considerations to use a steep flight path angle. It is to be noted that the temperature time history may be varied in other manners by changing the flight path angle to a desired value between −1 degree and −2 degrees.

Therefore, it has been shown that the temperature rate feedback system of this invention controls the temperatures and temperature time history so that with a small flight path angle the peak temperature developed on the surface of a craft may be reduced and with a steep flight path angle the maximum temperatures are developed initially in the descent into the atmosphere. Also with intermediate flight path angles, other temperature results are developed which may be found to be advantageous.

The temperature rate feedback loop 98 is generally only switched into the system during the period of re-entering the atmosphere when excessive temperatures are developed. During other periods of flight, the other controls of FIG. 1 guide the craft. It is to be again noted that the principles in accordance with this invention may be utilized to control the flight in other directional planes than elevation. For example, when the craft descends at high velocities from a large orbit, excessive velocities upon reaching the atmosphere may require banking of the craft as well as varying the angle of attack of the craft. It is to be recognized that the principles of this invention may be utilized to control banking as well as the angle of attack of the craft.

Thus, there has been described a control system from re-entry from space into the atmosphere which not only eliminates the short term oscillations about the center of gravity of the craft but also the skipping oscillations caused by the density of the atmosphere. The system is normally controlled by the pitch rate feedback system and by the pilot or by commands from an automatic guidance and navigation system. However, when desired, the skipping oscillations can be eliminated by closing the selector switch to provide temperature rate feedback. The temperature rate feedback system, depending upon a selected flight path angle for entering the atmosphere, provides lowering of the peak surface temperature of the craft or provides control of the temperature time history on the surface of the craft to allow use of ablation techniques. The temperature rate feedback loop system is relatively independent of atmospheric variations.

It has been calculated that the system produces only a 100 mile variation in range for a descent of 12,000 mile range with approximately a 25% variation in the exponential index of the atmosphere. Also, because the temperature rate is utilized rather than absolute temperature to provide a control signal, calibration of the temperature sensing device is not critical.

What is claimed is:

1. A flight path control system for controlling the temperature on the surface of a craft when entering a more dense atmosphere from a less dense atmosphere, said system comprising aerodynamic means for changing the attitude of the craft, actuator means linked to said aerodynamic means for controlling said aerodynamic means, summing means coupled to said actuator means for applying a control signal thereto, pitch rate means responsive to the rate of change of attitude of said craft and coupled to said summing means, temperature rate means coupled between the surface of said craft and said summing means, whereby said summing means develops said control signal for controlling the attitude of said craft so as to maintain a desired temperature condition on the surface of said craft.

2. A system for controlling the flight path of a craft when entering an atmosphere from space so as to control the temperature on the surface of the craft, said system comprising aerodynamic means mounted on said craft for controlling the flight path of said craft, actuating means linked to said aerodynamic means for controlling the position thereof, summing means coupled to said actuating means, temperature sensing means mounted on the surface of said craft, differentiating means coupled between said temperature sensing means and said summing means, said summing means thereby developing a signal to control said actuating means which in turn controls said aerodynamic means in response to changes in temperature.

3. A system for controlling the elevation angle of a craft in response to the rate of change of surface temperature of the craft, said system comprising an aerodynamic surface mounted on said craft for altering the attitude of said craft in response to the position of said surface, positioning means mounted on said craft and coupled to said aerodynamic surface, summing means coupled to said positioning means, navigational means coupled to said summing means, pitch rate gyro means mounted on said craft and coupled to said summing means, temperature sensing means mounted on the surface of said craft, differentiating means coupled to said sensing means, and limiting means coupled between said differentiating means and said summing means, whereby as the temperature rate increases at said surface, said elevation angle of said craft changes.

4. A system for controlling the elevation of a lift type craft having elevator means when entering the atmosphere from space so as to overcome altitude skipping oscillations and control the surface temperatures of the craft, said system comprising actuator means linked to said elevator means, summing means coupled to said actuator means, pilot control means coupled to said summing means, command signal means coupled to said summing means, gyro means mounted on said craft and coupled to said summing means, temperature sensor means mounted on the surface of said craft, differentiating means coupled to said sensor means, and switching means coupled between said differentiating means and said summing means, said summing means developing a control signal to control said elevator means and overcome the altitude skipping oscillations.

5. A system for controlling the angle of attack of a craft having an aerodynamic lift surface during re-entry of the craft into the earth's atmosphere from an orbital path, said system comprising an aerodynamic surface mounted on said craft for controlling the angle of attack, actuator means linked to said aerodynamic surface for controlling the position of said surface relative to said craft, summing means coupled to said actuator means for passing a control signal thereto, a pitch rate gyro loop mounted to said craft and coupled to said summing means to apply a pitch rate signal thereto, a temperature rate loop mounted on said craft and coupled to said summing means to apply a temperature rate signal thereto, and navigation means coupled to said summing means to apply a navigational signal thereto, whereby said summing means develops and applies the control signal to said actuator means to maintain said craft in a flight path as determined by the temperature developed on the surface of said craft.

6. A system for controlling the elevation of a craft when descending into the atmosphere so as to overcome altitude skipping oscillations caused by rapid descent into the relatively dense atmosphere, aerodynamic elevator means mounted on said craft, said system comprising positioning means linked to said elevator means, summing means coupled to said positioning means, navigation means coupled to said summing means, pitch rate gyro means mounted on said craft and coupled to said summing means, temperature sensing means mounted on said craft and responsive to the temperature developed as said craft descends into the atmosphere, differentiating means coupled to said temperature sensing means, and switching means coupled between said differentiating means and said summing means, said navigation means controlling said summing means to navigate said craft, said pitch rate gyro means controlling said summing means to stabilize said craft, and said temperature sensing means and differentiating means controlling said summing means to overcome the altitude skipping oscillations.

7. A flight path control system for controlling the temperature on the surface of a craft when re-entering the atmosphere from space, said system comprising aerodynamic means mounted on the craft for varying the attitude of said craft, actuator means linked to said aerodynamic means for controlling the position thereof, temperature sensing means mounted on the surface of said craft for sensing the temperature thereof and developing temperature signals, differentiating means coupled to said temperature sensing means for developing a temperature rate signal from said temperature signals, limiting means coupled to said differentiating means for limiting said temperature rate signal, and switching means coupled to said limiting means, said switching means coupled to said actuator means for applying the limited temperature rate signal thereto to vary the attitude of said craft and control the temperature on the surface thereof.

8. A system for controlling the position of an elevator of a lift type craft when re-entering the atmosphere from space during descent to earth, the system overcoming short period oscillations about the center of gravity of the craft and overcoming altitude skipping oscillations for providing control of the surface temperatures of the craft so that the maximum temperatures developed on the surface of said craft occur during a relatively short initial time interval of the total descent time after re-entry, said system comprising actuator means linked to said elevator means, summing means coupled to said actuator means, pilot control means coupled to said summing means, command signal means coupled to said summing means, gyro means mounted on said craft and coupled to said summing means, temperature sensor means mounted on the surface of said craft, differentiating means coupled to said sensor means, and switching means coupled between said differentiating means and said summing means being controllable to be opened or closed, said summing means developing a control signal to control said elevator means to overcome the altitude skipping oscillations when said switching means is closed and developing a control signal to navigate said craft and to overcome said short period oscillations of said craft when said switch is open.

9. A system for controlling the elevation of a lift type craft having elevator means when the craft enters the atmosphere from space, said elevator means being controlled to overcome short period oscillations of the craft about its center of gravity and to overcome altitude skipping oscillation so as to control the surface temperatures of the craft, said system comprising actuator means linked to said elevator means, summing means coupled to said actuator means, navigation means coupled to said summing means for applying navigation signals thereto, gyro means mounted on said craft and coupled to said summing means for developing and applying signals to said summing means indicative of the short period oscillations, temperature sensor means mounted on the surface of said craft for developing temperature signals, differentiating means coupled to said sensor means for responding to said temperature signals to develop temperature rate signals, and switching means coupled between said differentiating means and said summing means for applying said temperature rate signals thereto when said switching means is closed, said summing means developing a control signal to control said elevator means to direct said craft to overcome the altitude skipping and the short period oscillations when said switching means is closed and developing a control signal to navigate said craft and to overcome said short period oscillations when said switching means is open.

10. A system for preventing altitude skipping of a craft when descending into the atmosphere from a space orbit by controlling the angle of attack of said craft into the atmosphere, said system responding to the temperatures developed on the surface of said craft, said system comprising elevator means mounted on said craft for decreasing the angle of attack to decrease the rate of descent and for increasing the angle of attack to increase the rate of descent, actuator means linked to said elevator means for controlling the position thereof, thermocouple means mounted on the surface of said craft to develop a temperature signal indicative of the temperature on said surface, differentiating means coupled to said thermocouple means for responding to said temperature signal to develop a temperature rate signal, and switching means coupled between said differentiating means and said actuator means, said temperature rate signal when positive controlling said actuating means to increase said angle of attack of said craft and when negative controlling said actuating means to decrease said angle of attack of said craft.

11. A system for controlling the elevation of a lift type craft when the craft enters the atmosphere from space so as to overcome altitude skipping oscillations and to control the surface temperatures of the craft, said craft having elevator means for controlling the direction of the craft, said system comprising actuator means linked to said elevator means, summing means coupled to said actuator means for applying a control signal thereto, pilot control means coupled to said summing means for applying a first navigational signal thereto, command signal means coupled to said summing means for applying a second navigation signal thereto, gyro means mounted on said craft and coupled to said summing means for applying a pitch rate signal thereto to compensate for oscillations of said craft about its center of gravity, temperature sensor means mounted on the surface of said craft to develop temperature signals, differentiating means coupled to said sensor means to respond to said temperature signals to develop temperature rate signals indicative of the rate of change of temperatures on said surface, and switching means coupled between said differentiating means and said summing means, said summing means developing a control signal which, when said switching means is closed, controls said elevator means so as to overcome the altitude skipping oscillations and to control the surface temperature of said craft, and when said switching means is open, navigates said craft while stabilizing the oscillations of said craft about its center of gravity.

12. A flight path control system for controlling the angle of attack of a craft during re-entry of the craft in a flight path into the earth's atmosphere from an orbital path, the craft having aerodynamic lift means and including an aerodynamic surface, the system controlling the craft so as to decrease the maximum temperature developed on the surface of the craft for relatively small entry angles of the flight path of the craft below the earth's horizon at the altitude of entry and for controlling the time history of the temperature developed on the surface so the maximum temperature is developed during the initial entry period for relatively large entry angles, said system comprising an elevator surface mounted on said craft for controlling the angle of attack, actuator means linked to said aerodynamic surface for controlling the position of said surface relative to said craft, summing means coupled to said actuator means for passing a control signal thereto, a pitch rate gyro loop mounted on said craft and coupled to said summing means to apply a pitch rate signal thereto, a temperature rate loop coupled to the aerodynamic surface to develop a temperature rate signal, switching means coupled between said temperature rate loop and said summing means to apply said temperature rate signal thereto when said switching means is closed, and navigation means coupled to said summing means to apply navigational signals thereto, whereby said summing means applies a control signal to said actuator means to maintain an angle of attack of said craft so as to either lower the temperature on said surface or to control the temperature time history, depending on the entry angle at which said craft enters the atmosphere.

13. A flight path control system for controlling the angle of attack of a craft in response to the temperature on the surface of said craft during re-entry into the earth's atmosphere from an orbital path when the temperature on the surface of said craft is high relative to the allowable temperatures of the materials of said craft, and for navigating said craft in response to navigation means when the temperatures on said surface are not excessive, said craft having aerodynamic lift means, said system comprising an aerodynamic surface mounted on said craft for controlling the angle of attack, actuator means linked to said aerodynamic surface for controlling the position of said surface relative to said craft, summing means coupled to said actuator means for passing a control signal thereto, a pitch rate gyro loop mounted on said craft and coupled to said summing means to apply a pitch rate signal thereto, a temperature rate loop coupled between the aerodynamic surface and said summing means to develop a temperature rate signal, switching means coupled in said temperature rate loop to apply said temperature rate signal to said summing means when said switching means is closed and to prevent said temperature rate signal from being applied to said summing means when said switching means is open, and navigation means coupled to said summing means to apply navigational signals thereto, whereby said summing means applies a control signal to said actuator means to maintain said craft in a flight path as determined by the temperature developed on said aerodynamic surface when said switching means is closed and applies a control signal to said actuator means to maintain said craft in a flight path as determined by said navigation means and said pitch rate gyro loop when said switching means is open.

No references cited.

UNITED STATES PATENT OFFICE
CERTIFICATE OF CORRECTION

Patent No. 3,120,364                      February 4, 1964

Janusz A. Stalony-Dobrzanski

It is hereby certified that error appears in the above numbered patent requiring correction and that the said Letters Patent should read as corrected below.

Column 1, line 21, for "reentry" read -- re-entry --; column 3, line 26, for "horizontal" read -- horizon --; column 4, line 28, for "reentering" read -- re-entering --; column 5, line 27, for "165" read -- 164 --; column 6, line 6, for "magimum" read -- maximum --.

Signed and sealed this 30th day of June 1964.

(SEAL)
Attest:

ERNEST W. SWIDER                      EDWARD J. BRENNER
Attesting Officer                      Commissioner of Patents